United States Patent
van Hasselt et al.

(10) Patent No.: US 10,733,504 B2
(45) Date of Patent: Aug. 4, 2020

(54) TRAINING REINFORCEMENT LEARNING NEURAL NETWORKS

(71) Applicant: DeepMind Technologies Limited, London (GB)

(72) Inventors: Hado Philip van Hasselt, London (GB); Arthur Clément Guez, London (GB)

(73) Assignee: DeepMind Technologies Limited, London (GB)

( * ) Notice: Subject to any disclaimer, the term of this patent is extended or adjusted under 35 U.S.C. 154(b) by 809 days.

(21) Appl. No.: 15/261,579

(22) Filed: Sep. 9, 2016

(65) Prior Publication Data

US 2017/0076201 A1    Mar. 16, 2017

Related U.S. Application Data (60) Provisional application No. 62/217,547, filed on Sep. 11, 2015.

(51) Int. Cl.
*G06N 3/08* (2006.01)

(52) U.S. Cl.
CPC ........................... *G06N 3/08* (2013.01)

(58) Field of Classification Search
CPC ......................................................... G06N 3/08
See application file for complete search history.

(56) References Cited

U.S. PATENT DOCUMENTS

| | | | | |
|---|---|---|---|---|
| 5,790,754 A | * | 8/1998 | Mozer | G10L 15/16 704/232 |
| 2014/0180975 A1 | | 6/2014 | Martinez et al. | |
| 2015/0024367 A1 | | 1/2015 | Singh | |
| 2015/0100530 A1 | * | 4/2015 | Mnih | G06N 3/0454 706/25 |
| 2016/0104056 A1 | * | 4/2016 | He | G06K 9/4609 382/158 |

FOREIGN PATENT DOCUMENTS

CN          104794359          4/2015

OTHER PUBLICATIONS

Huang, B. Q., Cao, G. Y., & Guo, M. (Aug. 2005). Reinforcement learning neural network to the problem of autonomous mobile robot obstacle avoidance. In 2005 International Conference on Machine Learning and Cybernetics (vol. 1, pp. 85-89). IEEE. (Year: 2005).*
JP Office Action in Japanese Application No. 2018-504858, dated Feb. 8, 2019, 8 pages (with English translation).

(Continued)

*Primary Examiner* — Vincent Gonzales
(74) *Attorney, Agent, or Firm* — Fish & Richardson P.C.

(57) ABSTRACT

Methods, systems, and apparatus, including computer programs encoded on computer storage media, for training a Q network used to select actions to be performed by an agent interacting with an environment. One of the methods includes obtaining a plurality of experience tuples and training the Q network on each of the experience tuples using the Q network and a target Q network that is identical to the Q network but with the current values of the parameters of the target Q network being different from the current values of the parameters of the Q network.

15 Claims, 3 Drawing Sheets

(56) References Cited

OTHER PUBLICATIONS

Tamakoshi et al, "Multi-agent Reinforcement Learning using Function Approximator in a Continous World", The Institute of Electronics, Information and Communication Engineers, Mar. 2000, 99(648):9-14 (English abstract only).
Volodymyr Mnih et al. "Human-level control through deep reinforcement learning," Nature, Feb. 25, 2015, 518:529-533.
Hado Van Hasselt et al. "Double Q-Learning," Advances in Neural Information Processing Systems, Dec. 5, 2010, 23C:1-9.
Grounds et al. "Parallel Reinforcement Learning with Linear Function Approximation," Adaptive Agents and Multi-Agent Systems III. Adaptation and Multi-Agent Learning. Springer Berlin Heidelberg Jan. 1, 2008, 2 pages.
Riedmiller et al. "Neural Fitted Q Iteration—First Experiences with a Data Efficient Neural Reinforcement Learning Method," Jan. 1, 2005, 317-328.
Hasselt et al. "Deep Reinforcement Reinforcement Learning with Double Q-learning," CoRR abs/1509.06461, 2015, 7 pages.
International Search Report and Written Opinion in International Application No. PCT/US2016/051095, dated Nov. 17, 2016.
EP Summons to attend oral proceedings pursuant to Rule 115(1) EPC in European Appln. No. 16770150.7, dated Jan. 24, 2020, 7 pages.
KR Office Action in Korean Appln No. 10-2017-7036754, dated Sep. 25, 2019, 15 pages. (with English translation).
IN Office Action in Indian Appin. No. 201847001222, dated Mar. 20, 2020, 7 pages.
Fuchida et al., "A Learning Method of RBF Network using Reinforcement Leaning Method," IEICE Technical Report (Institute of Electronics, Information and Communication Engineers), Mar. 2000, 99(684): 157-163 (with English abstract)
JP Office Action in Japanese Appln. No. 2018-504858, dated May 25, 2020, 10 pages (with English translation).
KR Notice of Allowance in Korean Appin. No. 10-2017-7036754, dated Apr. 27, 2020, 3 pages.

* cited by examiner

TRAINING REINFORCEMENT LEARNING NEURAL NETWORKS

CROSS-REFERENCE TO RELATED APPLICATION

This application claims priority to U.S. Provisional Application No. 62/217,547, filed on Sep. 11, 2015. The disclosure of the prior application is considered part of and is incorporated by reference in the disclosure of this application.

BACKGROUND

This specification relates to selecting actions to be performed by a reinforcement learning agent.

Reinforcement learning agents interact with an environment by receiving an observation that characterizes the current state of the environment and, in response, performing an action. Some reinforcement learning agents use neural networks to select the action to be performed in response to receiving any given observation.

Neural networks are machine learning models that employ one or more layers of nonlinear units to predict an output for a received input. Some neural networks are deep neural networks that include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes technologies that relate to reinforcement learning. In general, this specification describes training a Q network that is used to select actions to be performed by an agent that interacts with an environment by receiving an observation characterizing a current state of the environment and performing an action from a set of actions in response to the observation.

The subject matter described in this specification can be implemented in particular embodiments so as to realize one or more of the following advantages. A reinforcement learning system can effectively learn an effective action selection policy for an agent by training a Q network as described in this specification. In particular, by, during the training, selecting a next action using the Q network and then determining an estimated future cumulative reward for the next action using the target Q network, the reinforcement learning system can effectively learn an action selection policy that avoids overestimating cumulative future rewards for actions, as can occur when using only the target Q network to estimate the future cumulative reward for the next action during training. Employing an action selection policy that avoids overestimating cumulative rewards can result in the agent achieving improved performance on a variety of reinforcement learning tasks.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification generally describes a reinforcement learning system that selects actions to be performed by a reinforcement learning agent interacting with an environment. In order for the agent to interact with the environment, the system receives data characterizing the current state of the environment and selects an action from a set of actions space to be performed by the agent in response to the received data. Data characterizing a state of the environment will be referred to in this specification as an observation.

In some implementations, the environment is a simulated environment and the agent is implemented as one or more computer programs interacting with the simulated environment. For example, the simulated environment may be a video game and the agent may be a simulated user playing the video game. As another example, the simulated environment may be a motion simulation environment, e.g., a driving simulation or a flight simulation, and the agent is a simulated vehicle navigating through the motion simulation. In these implementations, the actions may be control inputs to control the simulated user or simulated vehicle.

In some other implementations, the environment is a real-world environment and the agent is a mechanical agent interacting with the real-world environment. For example, the agent may be a robot interacting with the environment to accomplish a specific task. As another example, the agent may be an autonomous or semi-autonomous vehicle navigating through the environment. In these implementations, the actions may be control inputs to control the robot or the autonomous vehicle.

In some cases, the observations characterize states of the environment using low-dimensional feature vectors that characterize the state of the environment.

In some other cases, the observations characterize states of the environment using high-dimensional pixel inputs from one or more images that characterize the state of the environment, e.g., images of the simulated environment or images captured by sensors of the mechanical agent as it interacts with the real-world environment.

Figure 1:
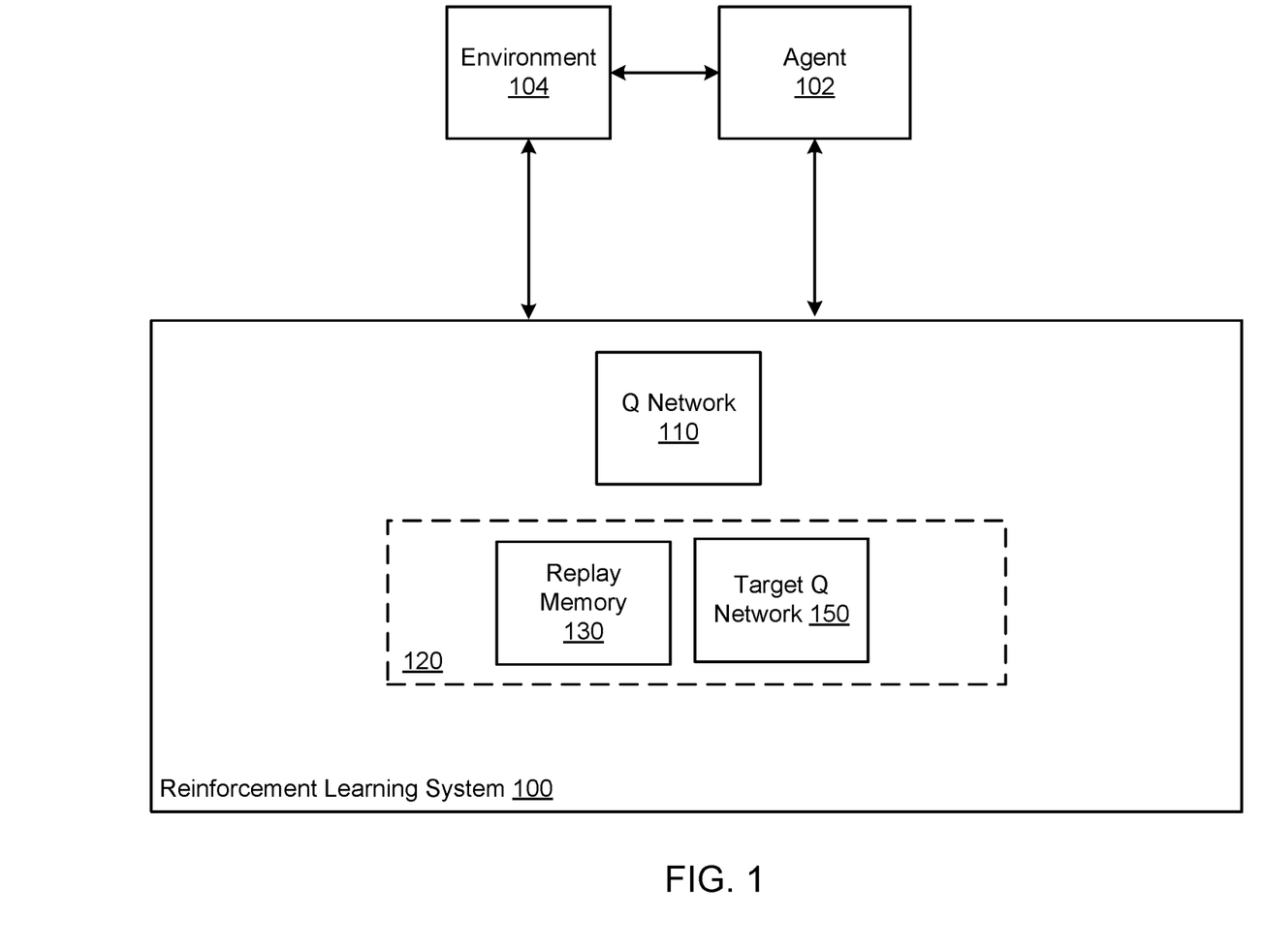
FIG. 1 shows an example reinforcement learning system.

FIG. 1 shows an example reinforcement learning system 100. The reinforcement learning system 100 is an example of a system implemented as computer programs on one or more computers in one or more locations in which the systems, components, and techniques described below are implemented.

The reinforcement learning system 100 selects actions to be performed by a reinforcement learning agent 102 interacting with an environment 104. That is, the reinforcement learning system 100 receives observations, with each observation characterizing a respective state of the environment 104, and, in response to each observation, selects an action from a set of actions to be performed by the reinforcement learning agent 102 in response to the observation.

In particular, the reinforcement learning system 100 selects actions using a Q network 110. The Q network 110 is a deep neural network that is configured to receive as input an input observation and an input action and to generate an estimated future cumulative reward from the input in accordance with a set of parameters.

The estimated future cumulative reward is an estimate of the future cumulative reward received if the agent performs the input action in response to the input observation. Each reward is a numeric value received, e.g., from the environment, as a consequence of the agent performing an action and the future cumulated reward is a combination of future rewards that will be received by the agent after receiving the input observation. For example, the estimated future cumulative reward can be an estimate of time-discounted total future rewards received after the agent performs the action.

To allow the agent 102 to effectively interact with the environment 104, the reinforcement learning system 100 trains the Q network 110 to determine trained values of the parameters of the Q network 110.

Once the Q network 110 has been trained, the reinforcement learning system 100 can effectively use the Q network 110 to select actions to be performed by the agent 104. In particular, when an observation is received after the Q network 110 has been trained, the reinforcement learning system 100 can, for each action in the set of actions, process the observation and the action using the Q network 110 in accordance with the trained values of the parameters of the Q network 110 to generate a respective estimated future cumulative reward for each of the actions. The reinforcement learning system 100 can then select the action having the highest estimated future cumulative reward as the action to be performed by the agent 102 in response to the observation. The agent 102 can then perform the selected action.

In some implementations, the reinforcement learning system 100 can store or transmit the trained values of the parameters that define the trained Q network 110 for future use in selection of actions to be performed by the agent 102 or by another agent.

To assist in the training of the Q network 110, the reinforcement learning system 100 maintains training components 120 that include a replay memory 130 and a target Q network 150.

The replay memory 130 stores experience tuples generated as a consequence of the interaction of the agent 102 with the environment 104 for use in training the Q network 110.

In particular, each experience tuple in the replay memory includes a training observation that characterizes a training state of the environment, a training action performed by the agent 102 in response to the training observation, a training reward received by the reinforcement learning system 100 in response to the agent 102 performing the training action, and a next observation characterizing a next state of the environment 104, i.e., the state that the environment 104 transitioned into after the agent 102 performed the training action.

The reinforcement learning system 100 generates the experience tuples from the interactions of the agent 102 with the environment 104 during the training of the Q network 110. An example process for generating an experience tuple during training is described in more detail below with reference to FIG. 2.

The target Q network 150 is a neural network that is identical to, i.e., has the same neural network architecture as, the Q network 110, but that has possibly different parameter values from those of the Q network 110. That is, during the training of the Q network 110, the values of the parameters of the target Q network 150 are only periodically synched with the current values of the parameters of the Q network 110.

To train the Q network 110 using the training components 120, the reinforcement learning system 100 repeatedly selects minibatches of experience tuples from the replay memory 130. Each minibatch of experience tuples includes a predetermined number of experience tuples and the reinforcement learning system 100 may select the experience tuples for a given minibatch in any appropriate manner, e.g., randomly or according to some predetermined criteria.

For each experience tuple in a given minibatch, the reinforcement learning system 100 uses the Q network 110 and the target Q network 150 to determine updates for the current values of the parameters of the Q network 110 and then adjusts the current values of the parameters of the Q network 110 using the updates. Generating these updates and adjusting the current values of the parameters of the Q network 110 will be described in more detail below with reference to FIG. 3.

During the training, the reinforcement learning system 100 also periodically updates the values of the parameters of the target Q network 150 to match the values of the parameters of the Q network 110.

Once a minibatch of experience tuples has been used in training, the reinforcement learning system 100 can remove the experience tuples in the minibatch from the replay memory 130.

Generally, during the training, the reinforcement learning system 100 generates experience tuples and adds the generated tuples to the replay memory 130 independently of, i.e., asynchronously from, sampling experience tuples from the replay memory 130 and adjusting the parameters of the Q network 110.

Figure 2:
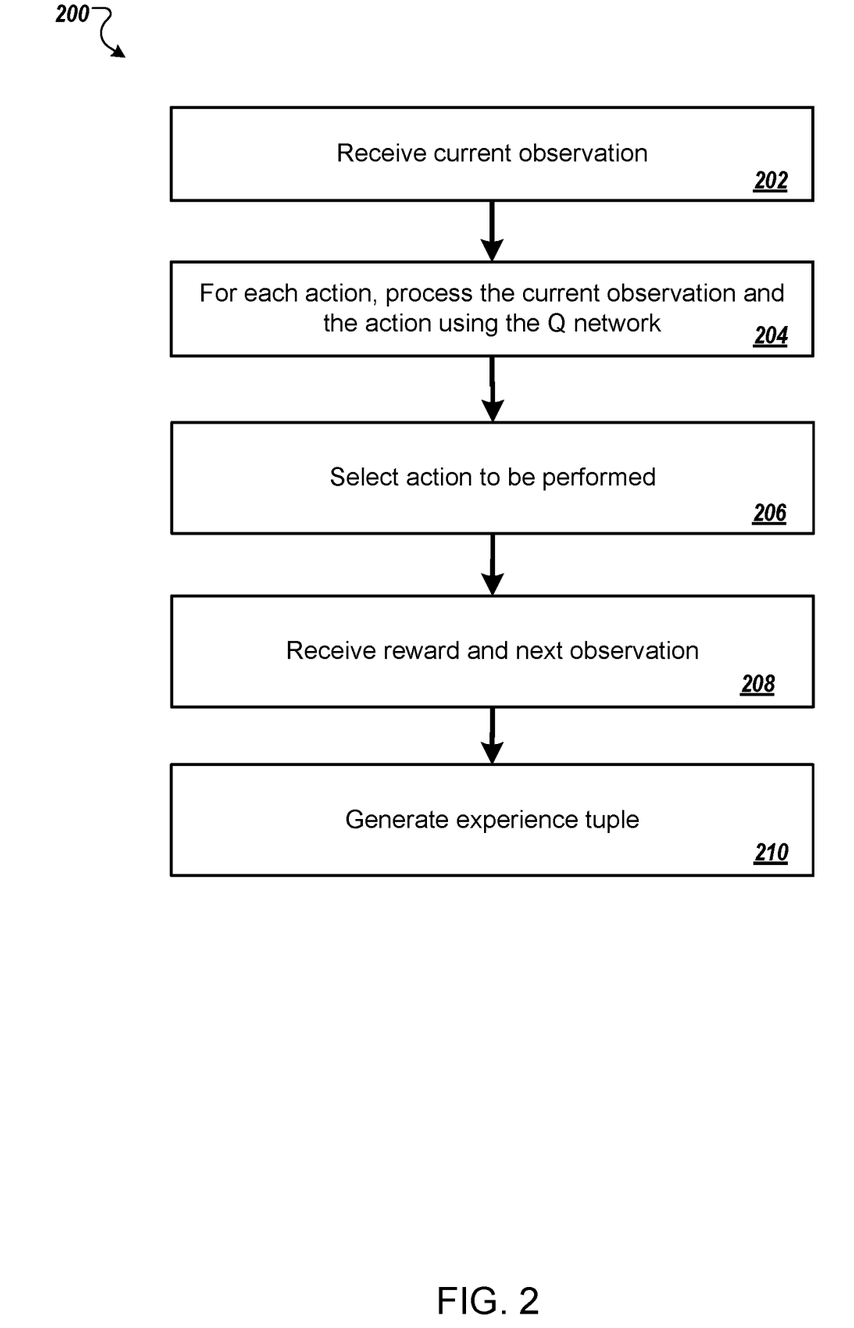
FIG. 2 is a flow diagram of an example process for adding an experience tuple to a replay memory.

FIG. 2 is a flow diagram of an example process 200 for adding an experience tuple to a replay memory. For convenience, the process 200 will be described as being performed by a system of one or more computers located in one or more locations. For example, a reinforcement learning system, e.g., the reinforcement learning system 100 of FIG. 1, appropriately programmed in accordance with this specification, can perform the process 200.

The system receives a current observation characterizing the current state of the environment (step 202).

For each action in the set of actions, the system processes the current observation and the action using the Q network in accordance with current values of the parameters of the Q network (step 204). As described above, the Q network is a deep neural network that is configured to receive as input an observation and an action and to generate an estimated future cumulative reward from the input in accordance with a set of parameters. Thus, by, for each action, processing the current observation and the action using a Q network in accordance with current values of the parameters of the Q network, the system generates a respective estimated future cumulative reward for each action in the set of actions.

The system selects an action to be performed by the agent in response to the current observation using the estimated future cumulative rewards (step 206).

In some implementations, the system selects the action with the highest estimated cumulative future reward as the action to be performed by the agent.

In some other implementations, to encourage exploration of the environment during training, the system selects the action using an exploration policy, e.g., by selecting the action with the highest estimated cumulative future with probability 1−ε and randomly selecting an action from the set with probability ε.

The system receives a reward and a next observation (step 208). The next observation characterizes the next state of the environment, i.e., the state that the environment transitioned into as a result of the agent performing the selected action, and the reward is a numeric value that is received by the system, e.g., from the environment, as a consequence of the agent performing the selected action.

The system generates an experience tuple that includes the current observation, the selected action, the reward, and the next observation and stores the generated experience tuple in a replay memory for use in training the Q network (step 210).

Figure 3:
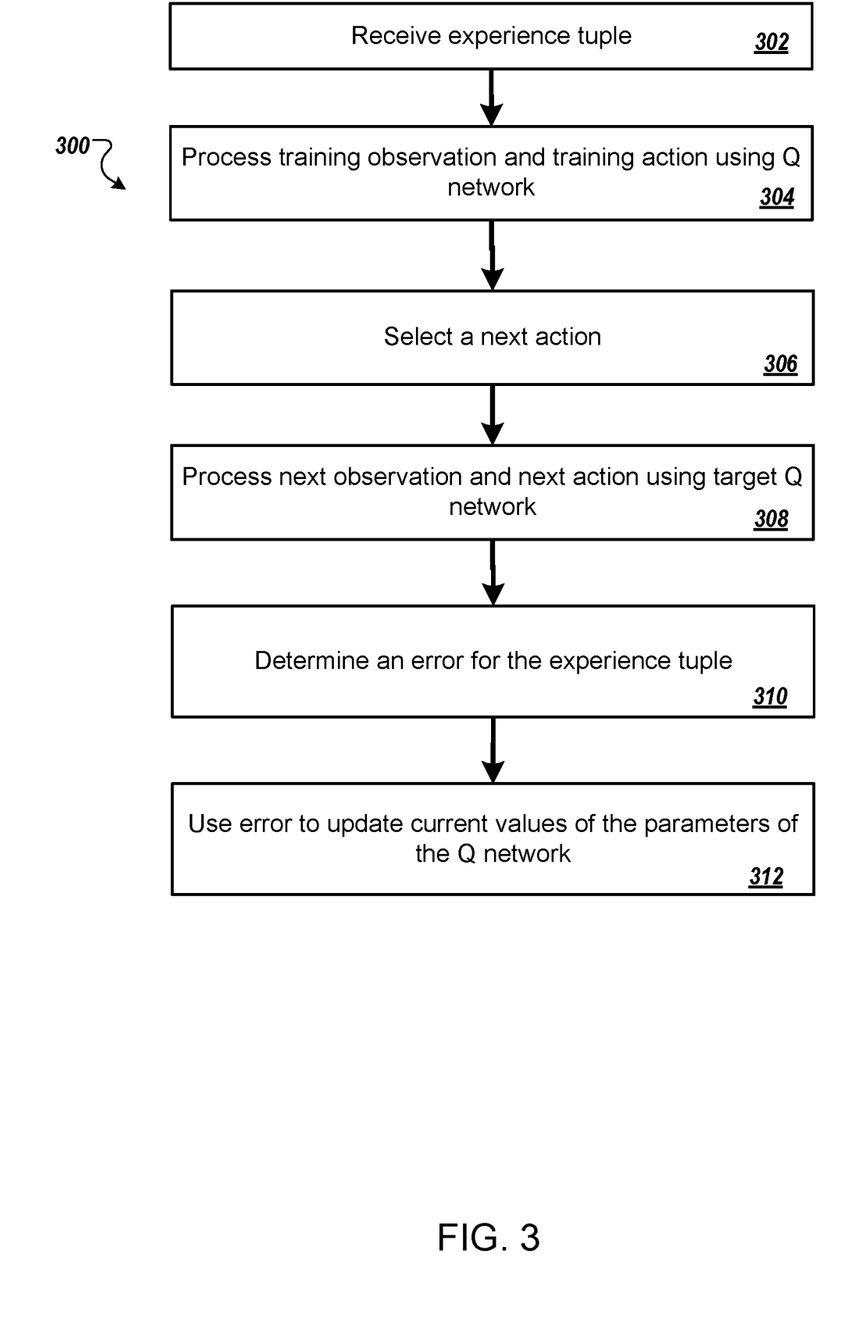
FIG. 3 is a flow diagram of an example process for updating the current values of the parameters of the Q network.

FIG. 3 is a flow diagram of an example process 300 for determining an update to the current values of the parameters of the Q network. For convenience, the process 300 will be described as being performed by a system of one or more computers located in one or more locations. For example, a reinforcement learning system, e.g., the reinforcement learning system 100 of FIG. 1, appropriately programmed in accordance with this specification, can perform the process 300.

The system receives an experience tuple (step 302). The experience tuple is one of the experience tuples in a minibatch of experience tuples sampled from the replay memory by the system.

The experience tuple includes a training observation characterizing a training state of the environment, a training action from the set of actions that was performed by the agent in response to receiving the training observation, a training reward received as a consequence of the agent performing the training action, and a next training observation characterizing a next training state of the environment.

The system processes the training observation and the training action in the experience tuple using the Q network to determine a current estimated future cumulative reward for the experience tuple in accordance with current values of the parameters of the Q network (step 304).

The system selects a next action from the set of actions (step 306). The next action is the action that, when processed in combination with the next observation by the Q network, generates the highest estimated future cumulative reward. That is, for each action in the set of actions, the system processes the next observation and the action using the Q network in accordance with the current values of the parameters of the Q network to generate a next estimated future cumulative reward for the action. The system then selects the action having the highest next estimated future cumulative reward as the next action.

The system processes the next observation and the next action using the target Q network to generate a next target estimated future cumulative reward for the next action in accordance with current values of the parameters of the target Q network (step 308). As described above, the target Q network is identical to the Q network but the current values of the parameters of the target Q network are generally different from the current values of the parameters of the Q network.

Thus, to determine the next target estimated future cumulative reward for the experience tuple, the system uses the Q network to select the next action and then uses the target Q network to generate the next target estimated future cumulative reward instead of directly using the largest target estimated future cumulative reward generated by the target Q network as the next target estimated future cumulative reward.

The system determines an error for the experience tuple from the current estimated future reward, the training reward, and the next target estimated future cumulative reward (step 310). For example, the error E may satisfy:

$$E = R + \gamma * NTER - CER,$$

where R is the reward in the experience tuple, $\gamma$ is a specified discount factor, NTER is the next target estimated future cumulative reward, and CER is the current estimated future cumulative reward.

The system uses the error to update the current values of the parameters of the Q network (step 312). That is, the system can determine an update to the current values of the parameters of the Q network that reduces the error using conventional machine learning training techniques, e.g., by performing an iteration of gradient descent with backpropagation. Once an update for each experience tuple in the minibatch has been determined, the system can apply the updates to the current values of the parameters of the Q network to generate updated values of the parameters.

Once updated values of the parameters of Q network have been determined, the system determines whether criteria for updating the current values of the target Q network parameters are satisfied. For example, the system may update the parameters of the target Q network after every T minibatches have been processed, with T being an integer greater than 1.

If the criteria are satisfied, the system updates the current values of the target Q network parameters to synchronize them with the updated values of the Q network parameters.

By repeatedly performing the process 300 on multiple different minibatches of experience tuples, the system can train the Q network to determine trained values of the parameters of the Q network and to allow the Q network to effectively be used to select actions to be performed by the agent in interacting with the environment. In particular, by using the Q network to select the next action and then using the target Q network to generate the next target estimated future cumulative reward instead of directly using the largest target estimated future cumulative reward generated by the target Q network as the next target estimated future cumulative reward during the training, the system can mitigate overestimation errors in the estimated rewards generated by the trained Q network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a relationship graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method of training a Q network used to select actions to be performed by an agent that interacts with an environment by receiving observations characterizing states of the environment and performing actions from a set of actions in response to the observations,
   wherein the Q network is a deep neural network that is configured to receive as input an input observation and an input action and to generate an estimated future cumulative reward from the input in accordance with a set of parameters, and
   wherein the method comprises:
      obtaining a plurality of experience tuples, wherein each experience tuple includes a training observation, an action performed by the agent in response to receiving the training observation, a reward received in response to the agent performing the action, and a next training observation that characterizes a next state of the environment; and
      training the Q network on each of the experience tuples, comprising, for each experience tuple:
         processing the training observation in the experience tuple and the action in the experience tuple using the Q network to determine a current estimated future cumulative reward for the experience tuple in accordance with current values of the parameters of the Q network;
         determining a next target estimated future cumulative reward for the experience tuple using both the Q network and a target Q network, wherein the target Q network has a same neural network architecture as the Q network but the current values of the parameters of the Q network are different from current values of a set of parameters of the target Q network, the determining comprising:
            selecting, using the Q network, an action from the set of actions that, when processed in combination with the next observation by the Q network, results in the Q network generating a highest estimated future cumulative reward, comprising:
               for each action in the set of actions, processing the next observation in the experience tuple and the action using the Q network to determine a respective next estimated future cumulative reward for the action in accordance with current values of the parameters of the Q network; and
               selecting an action from the set of actions that has the highest next estimated future cumulative reward;
            determining, using the target Q network, a next target estimated future cumulative reward for the selected action that was selected using the Q network, comprising processing the next observation in the experience tuple and the selected action using the target Q network to determine the next target estimated future cumulative reward for the selected action in accordance with the current values of the parameters of the target Q network;
         determining an error for the experience tuple from the reward in the experience tuple, the next target estimated future cumulative reward for the selected action, and the current estimated future cumulative reward; and
         using the error for the experience tuple to update the current values of the parameters of the Q network.

2. The method of claim 1, wherein the error E satisfies:

$$E=R+\gamma*NTER-CER,$$

where R is the reward in the experience tuple, $\gamma$ is a specified discount factor, NTER is the next target estimated future cumulative reward for the selected action, and CER is the current estimated future cumulative reward.

3. The method of claim 1, wherein using the error for the experience tuple to update the current values of the parameters of the Q network comprises:
   updating the current values of the parameters of the Q network to reduce the error using a machine learning training technique.

4. The method of claim 1, wherein the values of the parameters of the target Q network are periodically synchronized with the values of the parameters of the Q network.

5. The method of claim 4, further comprising:
   after training the Q network on each of the experience tuples to determine updated values of the parameters of the Q network, updating the current values of the target Q network to match the updated values of the parameters of the Q network.

6. A system comprising one or more computers and one or more storage devices storing instructions that, when executed by the one or more computers, cause the one or more computers to perform operations for training a Q network used to select actions to be performed by an agent that interacts with an environment by receiving observations characterizing states of the environment and performing actions from a set of actions in response to the observations,
   wherein the Q network is a deep neural network that is configured to receive as input an input observation and an input action and to generate an estimated future cumulative reward from the input in accordance with a set of parameters, and
   wherein the operations comprise:
      obtaining a plurality of experience tuples, wherein each experience tuple includes a training observation, an action performed by the agent in response to receiving the training observation, a reward received in response to the agent performing the action, and a next training observation that characterizes a next state of the environment; and training the Q network on each of the experience tuples, comprising, for each experience tuple:
  processing the training observation in the experience tuple and the action in the experience tuple using the Q network to determine a current estimated future cumulative reward for the experience tuple in accordance with current values of the parameters of the Q network;
  determining a next target estimated future cumulative reward for the experience tuple using both the Q network and a target Q network, wherein the target Q network has a same neural network architecture as the Q network but the current values of the parameters of the Q network are different from current values of a set of parameters of the target Q network, the determining comprising:
    selecting, using the Q network, an action from the set of actions that, when processed in combination with the next observation by the Q network, results in the Q network generating a highest estimated future cumulative reward, comprising:
      for each action in the set of actions, processing the next observation in the experience tuple and the action using the Q network to determine a respective next estimated future cumulative reward for the action in accordance with current values of the parameters of the Q network; and
      selecting an action from the set of actions that has the highest next estimated future cumulative reward;
    determining, using the target Q network, a next target estimated future cumulative reward for the selected action that was selected using the Q network, comprising processing the next observation in the experience tuple and the selected action using the target Q network to determine the next target estimated future cumulative reward for the selected action in accordance with the current values of the parameters of the target Q network;
    determining an error for the experience tuple from the reward in the experience tuple, the next target estimated future cumulative reward for the selected action, and the current estimated future cumulative reward; and
    using the error for the experience tuple to update the current values of the parameters of the Q network.

7. The system of claim 6, wherein the error E satisfies:

$$E=R+\gamma*NTER-CER,$$

where R is the reward in the experience tuple, γ is a specified discount factor, NTER is the next target estimated future cumulative reward for the selected action, and CER is the current estimated future cumulative reward.

8. The system of claim 6, wherein using the error for the experience tuple to update the current values of the parameters of the Q network comprises:
  updating the current values of the parameters of the Q network to reduce the error using a machine learning training technique.

9. The system of claim 6, wherein the values of the parameters of the target Q network are periodically synchronized with the values of the parameters of the Q network.

10. The system of claim 9, the operations further comprising:
  after training the Q network on each of the experience tuples to determine updated values of the parameters of the Q network, updating the current values of the target Q network to match the updated values of the parameters of the Q network.

11. One or more non-transitory computer storage media encoded with instructions that, when executed by one or more computers, cause the one or more computers to perform operations for training a Q network used to select actions to be performed by an agent that interacts with an environment by receiving observations characterizing states of the environment and performing actions from a set of actions in response to the observations,
  wherein the Q network is a deep neural network that is configured to receive as input an input observation and an input action and to generate an estimated future cumulative reward from the input in accordance with a set of parameters, and
  wherein the operations comprise:
    obtaining a plurality of experience tuples, wherein each experience tuple includes a training observation, an action performed by the agent in response to receiving the training observation, a reward received in response to the agent performing the action, and a next training observation that characterizes a next state of the environment; and
    training the Q network on each of the experience tuples, comprising, for each experience tuple:
      processing the training observation in the experience tuple and the action in the experience tuple using the Q network to determine a current estimated future cumulative reward for the experience tuple in accordance with current values of the parameters of the Q network;
      determining a next target estimated future cumulative reward for the experience tuple using both the Q network and a target Q network, wherein the target Q network has a same neural network architecture as the Q network but the current values of the parameters of the Q network are different from current values of a set of parameters of the target Q network, the determining comprising:
        selecting, using the Q network, an action from the set of actions that, when processed in combination with the next observation by the Q network, results in the Q network generating a highest estimated future cumulative reward, comprising:
          for each action in the set of actions, processing the next observation in the experience tuple and the action using the Q network to determine a respective next estimated future cumulative reward for the action in accordance with current values of the parameters of the Q network; and
          selecting an action from the set of actions that has the highest next estimated future cumulative reward;
        determining, using the target Q network, a next target estimated future cumulative reward for the selected action that was selected using the Q network, comprising processing the next observation in the experience tuple and the selected action using the target Q network to determine the next target estimated future cumulative reward for the selected action in accordance with the current values of the parameters of the target Q network;

determining an error for the experience tuple from the reward in the experience tuple, the next target estimated future cumulative reward for the selected action, and the current estimated future cumulative reward; and using the error for the experience tuple to update the current values of the parameters of the Q network.

12. The computer storage media of claim 11, wherein the error E satisfies:

$$E=R+\gamma*NTER-CER,$$

where R is the reward in the experience tuple, γ is a specified discount factor, NTER is the next target estimated future cumulative reward for the selected action, and CER is the current estimated future cumulative reward.

13. The computer storage media of claim 11, wherein using the error for the experience tuple to update the current values of the parameters of the Q network comprises:

updating the current values of the parameters of the Q network to reduce the error using a machine learning training technique.

14. The computer storage media of claim 11, wherein the values of the parameters of the target Q network are periodically synchronized with the values of the parameters of the Q network.

15. The computer storage media of claim 14, the operations further comprising:

after training the Q network on each of the experience tuples to determine updated values of the parameters of the Q network, updating the current values of the target Q network to match the updated values of the parameters of the Q network.

* * * * *